US012688764B2

(12) United States Patent
Dial, IV et al.

(10) Patent No.: US 12,688,764 B2
(45) Date of Patent: Jul. 21, 2026

(54) SECURITY SYSTEMS AND METHODS FOR STRUCTURES WITH MOVEABLE COMPONENTS

(71) Applicant: Comcast Cable Communications, LLC, Philadelphia, PA (US)

(72) Inventors: John Degraffenreid Dial, IV, Austin, TX (US); Lewis Clay Dearman, Taylor, TX (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 16/520,995

(22) Filed: Jul. 24, 2019

(65) Prior Publication Data

US 2020/0020214 A1 Jan. 16, 2020

Related U.S. Application Data

(63) Continuation of application No. 15/875,151, filed on Jan. 19, 2018, now Pat. No. 10,410,484.

(51) Int. Cl.
*G08B 13/08* (2006.01)
*G08B 3/10* (2006.01)

(52) U.S. Cl.
CPC ............... *G08B 13/08* (2013.01); *G08B 3/10* (2013.01)

(58) Field of Classification Search
CPC .................................. G08B 13/08; G08B 3/10
USPC ...... 340/545.2, 17, 521, 540, 541, 584, 606, 340/665–666, 693
See application file for complete search history.

(56) References Cited

U.S. PATENT DOCUMENTS

| | | | | |
|---|---|---|---|---|
| 6,373,215 B1 * | 4/2002 | Grabmaier | B60S 1/0822 | 318/483 |
| 8,375,634 B2 * | 2/2013 | Brandley | E06B 7/086 | 49/73.1 |
| 9,909,363 B1 * | 3/2018 | Hall | G08B 13/08 | |
| 10,089,851 B1 * | 10/2018 | Singh | G08B 21/182 | |
| 2014/0167969 A1 * | 6/2014 | Wedig | G08B 7/066 | 340/584 |
| 2014/0209254 A1 | 7/2014 | Birru et al. | | |
| 2015/0194036 A1 * | 7/2015 | Zhevelev | G08B 21/18 | 340/540 |
| 2015/0348385 A1 * | 12/2015 | Lamb | G08B 29/20 | 340/547 |
| 2016/0083990 A1 * | 3/2016 | Ricks | G08B 13/08 | 16/223 |
| 2016/0121699 A1 * | 5/2016 | Snider | E05F 15/60 | 49/13 |
| 2016/0189496 A1 * | 6/2016 | Modi | G08B 13/08 | 340/545.2 |
| 2018/0047265 A1 * | 2/2018 | Rodolico | G08B 21/10 | |

(Continued)

FOREIGN PATENT DOCUMENTS

JP 2007039991 * 2/2007

*Primary Examiner* — Tai T Nguyen
(74) *Attorney, Agent, or Firm* — BakerHostetler

(57) ABSTRACT

Systems and methods are described for securing structures with moveable components. A structure may comprise a plurality of panes. A sensor device may be disposed on a pane of the structure. The sensor device may determine a position of the pane. A computing device in communication with the sensor device may receive, from the sensor device, an indication of the position or state of the pane. The computing device may determine, based on the position or state of the pane, a state of the structure.

20 Claims, 7 Drawing Sheets

(56) References Cited

U.S. PATENT DOCUMENTS

| | | | | |
|---|---|---|---|---|
| 2019/0146441 | A1 * | 5/2019 | Cirino | H04L 67/12 700/9 |
| 2019/0292815 | A1 * | 9/2019 | Hu | G07C 9/00 |

* cited by examiner

SECURITY SYSTEMS AND METHODS FOR STRUCTURES WITH MOVEABLE COMPONENTS

CROSS REFERENCE TO RELATED APPLICATIONS

This application is a continuation of U.S. patent application Ser. No. 15/875,151, filed Jan. 19, 2018, now issued U.S. Pat. No. 10,410,484, which is hereby incorporated by references in its entirety.

BACKGROUND

Traditional home security systems use door and window sensors comprising two parts—a sensor and a magnet. If the sensor and magnet are aligned, a magnetic field is produced. The magnetic field causes one or more magnetic contacts of the sensor to move and close a circuit. If the sensor and magnet are misaligned, such as based on an opening of a door or window, the magnetic field is lost and the circuit is opened. Based on the opening of the circuit, an alarm may be triggered. However, traditional home security systems are unsuited for structures comprising a plurality of moveable components, such as components configured to open and close or components configured to rotate. Examples of structures comprising a plurality of moveable components include jalousie windows or louver windows. A moveable component, on which the sensor is disposed may remain in a stationary position, even if another moveable component is removed, allowing entry without the triggering of an alarm. Therefore, there is a need for a security system suitable for structures comprising a plurality of moveable components.

SUMMARY

A structure, such as a door or a window, may comprise a plurality moveable components, such as slats, panes, or louvers. A plurality of panes may be arranged horizontally. The panes may be configured to rotate such that each pane is parallel relative to the other panes. One or more sensor devices may be coupled to or disposed on one or more of the plurality of panes. Each of the sensor devices may be coupled to or disposed on a different one of the plurality of panes. The one or more sensor devices may be configured to determine a position of the one or more of the plurality of panes. The position of the one or more of the plurality of panes may comprise, for example, an angle of tilt, an opening, a closing, a tampering, a rotation, or a movement of the one or more of the plurality of panes. A computing device may be configured to receive, from the one or more sensor devices, an indication of the position of the one or more of the plurality of panes. The computing device may be configured to determine a state of the structure based on the position of the one or more of the plurality of panes. The state of the structure may comprise, for example, an open state, a closed state, a breached state, a movement, or an opening angle of the structure.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
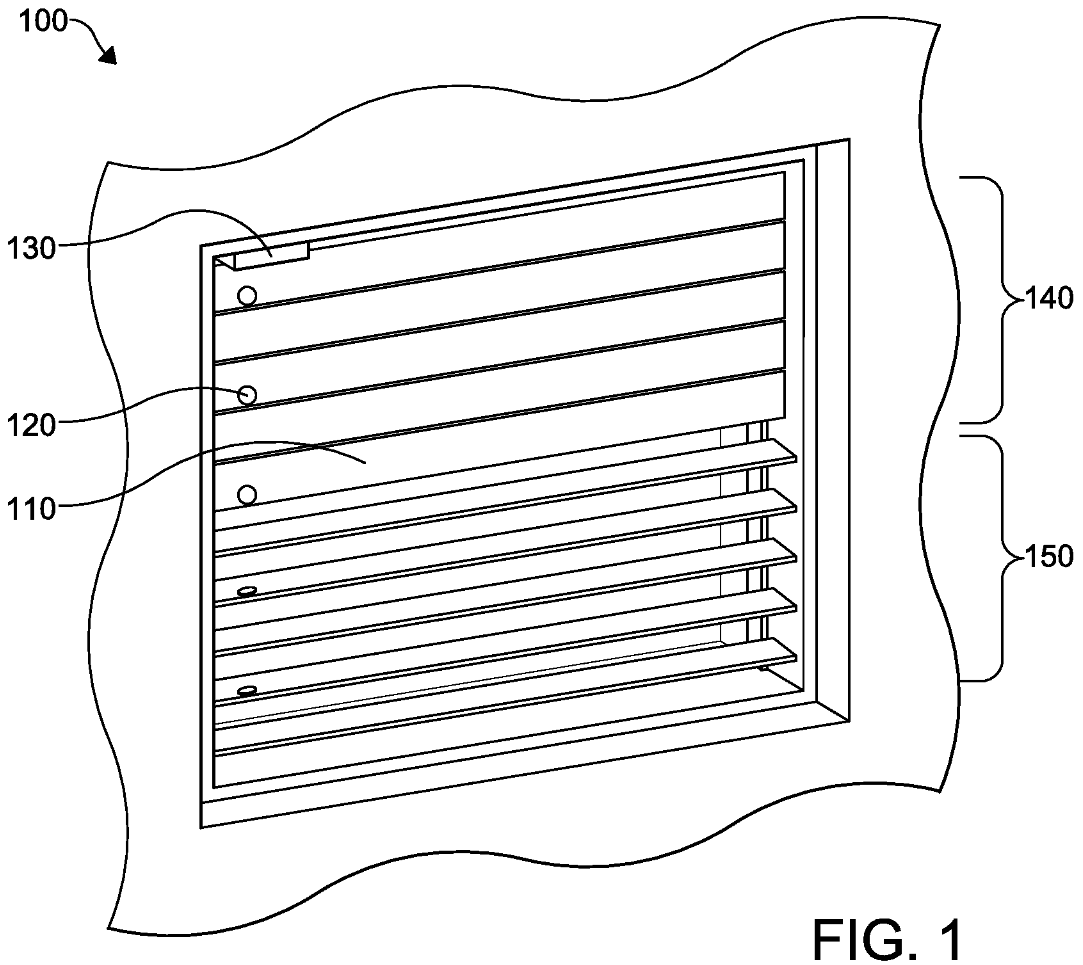
FIG. 1 is a diagram of an example system.

Systems and methods are described for securing a structures with moveable components. The systems and methods may comprise installing sensor devices on moveable components, such as slats, panes, or louvers of a structure, such as a window or a door. The moveable components may be configured to open, close, or rotate, for example. Examples of windows with moveable components include jalousie windows and louver windows. The sensor devices may be configured to determine states of the moveable components of the structure, such as closed, open, tampered, breached, moving, or non-moving states. The sensor devices may be configured to determine positions of the moveable components of the structure, such as angles of tilt or orientations of the components. The angles of tilt and orientation may be with respect to a fixed reference axis or plane. The angles of tilt and orientation may be with respect to a reference axis or plane formed by the sensor devices.

The sensor devices may be configured to send an indication of the states or positions of the moveable components. The sensor devices may be configured to communicate via a communication protocol, such as Wi-Fi, Blue Tooth, Zigbee, or a proprietary protocol, for example. The proprietary protocol may comprise a protocol that associated with a company or organization that may own or have rights to the proprietary protocol. The company or organization may comprise, for example, a manufacturer of the sensor devices, a communications company, or a technology company. The company or organization may create the proprietary protocol. The proprietary protocol may not be published or made public. The proprietary protocol may be owned by the company or organization. The proprietary protocol may be patented or a trade secret. The proprietary protocol may be subject to restrictions placed by the company or organization.

The sensor devices may send the indication of the states or the positions to a computing device. The computing device may comprise one or more processors. The computing device may comprise a memory. The computing device may comprise a mobile device, such as a laptop computer, a cellular phone, a tablet, or an Internet of Things (IoT) device. The computing device may comprise a security system device, an entertainment system device, or a home automation device. The computing device may be in communication with a plurality of devices, such as security system devices, home automation devices, or premises management devices. The computing device may comprise a gateway device. The gateway device may be configured to control and communicate with a plurality of devices, such as devices located at a premises and devices external to the premises. The sensor devices may be located at the premises. The gateway device may be located at the premises or may be located external to the premises.

Based on the indication of the states or positions of the moveable components, the computing device may determine a state or a position of the structure. The state of the structure may comprise an open state, a closed state, or a breached state, for example. The position of the structure may comprise an angle of tilt of the moveable components or an amount by which the structure is open. For example, the structure may be fully open or partially open. Based on the indication of the positions or states of the moveable components, the computing device may determine that one or more of the moveable components is in a different state from the other moveable components. The computing device may determine a breach of the structure or damage to the structure, such as based on the determination that the one or more moveable components is in a different state or position. Based on the determined state or position of the structure, the computing device may trigger an alarm. The systems and methods described may allow home owners to protect their home by arming a security system and leaving structures with moveable components, such as jalousie windows or louver windows, left open or partially-open for cooling.

A plurality of structures with moveable components may be located at a premises. The premises may comprise an enclosed building, such as a house, a commercial center, an industrial center, or an office building. The premises may comprise a semi-open building, such as a stadium, a stable, or a pavilion. The premises may comprise a plurality of buildings, such as a neighborhood, a shopping complex, or a campus. The premises may comprise areas between the plurality of buildings, such as a parking lot, road, or walkway. The premises may comprise an open area, such as a tract of land, a farm, a park, or a field. The premises may comprise a plurality of zones. The zones may comprise physically divided portions of the premises, such as rooms of building, units of a building, or buildings within a plurality of buildings. The zones may comprise areas divided by geophones or areas defined by geographic coordinates, such as global positioning system (GPS) coordinates.

The computing device may be configured to pair with sensor devices in a zone of the plurality of zones. The computing device may be located in the zone. The computing device may be configured to determine a subset of the plurality of sensor devices that are located in the zone. The computing device may be configured to pair with sensor devices disposed on a structure with moveable components. The computing device may be located proximate the structure or in the same zone as the structure. The computing device may be configured to determine a subset of the plurality of sensor devices that are disposed on the structure.

The computing device located at the premises may be configured to switch to a pairing mode. In pairing mode, the computing device may be configured to receive signals from the plurality of sensor devices. The computing device may be configured to determine a quantity of signals received from each of the plurality of sensor devices within a period of time. The period of time may comprise a time that the computing device is in the pairing mode. For example, the computing device may be configured to operate in the pairing mode for 5 seconds, 10 seconds, or another period of time. Based on the quantity of signals received from the each of the plurality of sensor devices, the computing device may be configured to determine a subset of the plurality of sensor devices that are located in the zone or that are disposed on the structure. For example, the computing device may determine that a subset of the sensor devices, from which the most signals were received, are located in the zone or are disposed on the structure.

The computing device may be configured to pair with the determined subset. Pairing with the determined subset may comprise communicating with the determined subset regarding the positions or states of moveable components of one or more structures. Pairing with the determined subset may comprise sending, to the determined subset, an indication of a communication protocol, such as an indication of an encryption protocol or an indication of a communication channel. The indication of the communication protocol may be send by performing a handshake with the determined subset. Pairing with the determined subset may comprise communicating, using the communication protocol, with the determined subset. The computing device may be configured to receive, from the determined subset, indications of positions or states of moveable components of one or more structures. Based on the states or positions of the moveable components, the computing device may be configured to determine a state of the one or more of the plurality of structures.

FIG. 1 shows an example structure with moveable components comprising a window 100. However, the disclosed system may secure another structure with moveable components, such as a door or a vent. The window 100 may comprise a jalousie window or a louver window. The window 100 may comprise a plurality of moveable components, such as panes 110. However, the system disclosed may secure a window with other moveable components, such as slats or louvers. The panes 110 may be of an equal size. The panes 110 may be rectangular. The panes 110 may be longer in a horizontal direction than in a vertical direction. The panes 110 may be arranged in a louver.

A sensor device 120 may be disposed on each of the panes 110. Sensor devices 120 may be disposed on select panes 110, such as every second pane 110 or every third pane 110, for example. The sensor devices 120 may be affixed to the panes 110, such as on a face or side of the each of the panes 110. The sensor devices 120 may be affixed to sides of the panes 110 that face opposite the window 100 if the panes 110 are in a closed position. The sensor devices 120 may be affixed to sides of the panes 110 that face downwards if the panes 110 are in an open or tilted position. The sensor devices 120 may be affixed at corresponding positions on the each of the panes 110. For example, the positions of the sensor devices 120 on the panes 110 may be aligned. The positions of the sensor devices 120 on the panes 110 may form an array or an axis. The sensor devices 120 may be affixed to the panes 110 using an adhesive substance, a nail, a screw, a magnet, or another securing method.

The sensor devices 120 may comprise tilt sensors. Tilt sensors may comprise rolling ball sensors. The sensor devices 120 may comprise orientation detectors, such as one, two, or three axis orientation detectors. The sensor devices 120 may comprise motion detectors, such as vibration detectors, accelerometers, gyroscopes, magnetometers, rotation detectors, or gravity sensors. One or more of the sensor devices 120 may comprise computing devices. For example, the sensor devices 120 may comprise processors and memory. One or more of the sensor devices 120 may comprise a master device. Other sensor devices may comprise slave devices. The master device may be configured to control the slave devices. The master device may have more computing, communication, or power capabilities than the slave devices. The master device may be configured to poll the slave devices. The master device may consume more power than the slave devices.

The sensor devices 120 may be configured to determine states or positions of the panes 110. For example, each sensor device 120 may determine a state or position of a pane 110 on which the sensor device 120 is disposed. The state of the pane 110 may comprise a moving state, a stationary state, an open state, a fully open state, a partially open state, a closed state, a breached state, or a tampered state, as examples. The position of the pane 110 may comprise an orientation of the pane 110, such as with respect to one or more axis or planes. The axis or plane may comprise one or more reference axis or planes. For example, the axis may comprise a magnetic axis or a gravitational axis. The axis or plane may comprise an axis or plane defined by the position of the panes 110 or by the position of the sensor devices 120 on the panes 110. For example, the sensor devices 120 may be arranged on the panes 110 such that they are in a line or other geometric configuration. The orientation of the pane 110 may comprise an angle of tilt or rotation with respect to the axis or plane. The sensor devices 120 may be configured to determine the angle in radians, degrees, tenths of degrees, quarters of degrees, or other units or denominations.

The sensor devices 120 may be configured to determine states of the sensor devices 120. The states of the sensor devices 120 may be associated with the states or positions of the panes 110. For example, if the sensor devices 120 comprise rolling ball sensors, the states of the sensor devices 120 may be associated with the position of the balls within the sensor devices 120, which may depend on the positions of the panes 110. The states of the sensor devices 120 may be associated with power levels or states of the sensor devices 120. The states of the sensor devices may be associated with communication of the sensor devices 120. For example, the states may comprise a strength of a received or transmitted signal. As another example, the states may comprise a status of a connection to a communication network.

The sensor devices 120 may be configured to send indications of the states or positions of the panes 110 or indications of the states of the sensor devices 120. The indications of the states or positions may comprise binary information. For example, the indications of the states or positions may comprise an indication of either an "open" state or a "closed" state. As another example, the indication of the states or positions may comprise an indication of either a "moving" state or a "non-moving" state. Sending binary information may be more efficient than sending non-binary information. Transmissions comprising binary information may comprise less data than transmissions comprising non-binary data.

The sensor devices 120 may be configured to be polled. The sensor devices 120 may be configured to operate in a power efficiency state, such as a sleep mode. The sensor devices 120 may be configured to operate in a mode, such as a wake mode, the uses more power to perform operations, such communication operations. As an example, the sensor devices 120 may be configured to switch to the wake mode in response to being polled or in response to detecting a change in the states or positions of the panes 110. The sensor devices 120 may comprise "transmit only" devices, such as devices configured to transmit the indications of the states or positions of the panes that may not be configured to receive data. Transmit only devices may be small or light weight enough to be installed on the panes 110 of the window 100 with minimal obtrusiveness. Also, transmit only devices may be more power efficient than devices that are not transmit only.

The indications of the states or positions may comprise indications of measurements of angles of tilt or rotation of the panes 110 with respect to a reference axis or plane. The indications of the states or positions may comprise indications of direction or speed of movement of the panes 110. The indications of the states or positions may comprise indications of power or communication states of the sensor devices 120.

The sensor devices 120 may be configured to send the indications of the states or positions of the panes 110. The sensor devices 120 may be configured to send the indications of the states or positions of the panes 110 via a communication protocol, such as Wi-Fi, Blue Tooth, Zigbee, or a proprietary protocol, for example. The sensor devices 120 may be configured to send the indications of the states or positions of the panes 110 at regular time intervals. The sensor devices 120 on the window 100 may send the indications at the same time or each sensor device 120 on the window 100 may send the indications at different times, such as at staggered times. The sensor devices 120 may be configured to send the indications at time intervals with random variance. For example, the sensor devices 120 may send the indications at time intervals with random jitters of 0 to 500 milliseconds. Random variance may avoid collision of transmitted indications of different devices. The sensor devices 120 may be configured to send the indications in response to a determination of a change in position or state of at least one of the panes 110. The sensor devices 120 may be configured to send the indication within a time period after a change is detected, such as to provide a buffer time to avoid sending false indications. Panes 110 of a window 100 may move at different times and the time period may allow for all of the sensor devices 120 on the window 100 to detect the changes. The time period may allow for one or more of the sensor devices 120 to determine that the detection of a change was an error. The period of time may comprise a period of a half a second, one second, or two seconds, for example.

The sensor devices 120 may be configured to send the indications in response to a determination of movement of at least one of the panes 110. The sensor devices 120 may be configured to send the indications in response to receiving data from another device. For example, the sensor devices 120 may send the indications in response to receiving, from another device, a request for the indications. As another example, the sensor devices 120 may be configured to send the indications in response to being polled by another device. The polling may comprise receiving a request for an indication of new data associated with the state or position of the panes 110. New data may comprise data associated with the states or positions of the panes 110 that has been determined or generated since a previous transmission of data associated with the states or positions of the panes 110.

The indications of the states or positions of the panes 110 may comprise one or more data fields. Table 1 shows example data fields of an indication, a name of each of the data fields, a data type corresponding to each of the data fields, and a description of each of the data fields.

TABLE 1

| Field Name | Data Type | Description |
|---|---|---|
| Device Identifier | UINT32 | Unique identifier for each sensor device |
| Message Type | ENUM8 | Message type being sent |
| Sensor Type | ENUM8 | Enumeration indication sensor type employed |
| Sensor State | BIT16 | 16 bit bitfield indicating current sensor state |
| Battery Voltage | UINT16 | Battery voltage in millivolts |
| Sensor Position | INT32 | Angular tilt position |

The device identifier may comprise a serial number or name of one of the sensor devices 120. The message type may be associated with the position or state of a pane 110 or state of the sensor device 120. For example, the message type may comprise a supervision type or a state change type. The supervision type message may indicate that the sensor device 120 is operating correctly. The supervision type message may be sent periodically to indicate continued operation of the sensor device 120. The state change type message may comprise an indication of a change in state, battery voltage, or position of the sensor device 120 or a change in state or position of the pane 110. The sensor device 120 may send the state change type message in response to determining the change. The sensor type may comprise, for example, a tilt sensor, a motion sensor, or an orientation sensor. The sensor state may be associated with a mode of operation of the sensor device 120. For example, the sensor state may comprise a sleep state or a wake state. The battery voltage may be associated with a battery of the sensor device 120. The sensor position may be associated with the state or position of the pane 110 or the sensor device 120. Although Table 1 shows example data fields of an indication, an indication may comprise another data field. The data field may comprise another field name, beyond the field names in Table 1. For example, the field name may comprise another character string that indicates a parameter described by the data in the field.

As shown in Table 1, each data field may comprise a data type. The indication may comprise a data field with another data type, beyond the data types in Table 1. The data type may comprise another data type such as an 8-bit, 16-bit, 32-bit, or 64-bit integer or number. The data type may comprise, for example, a signed integer (i.e., CHAR, BYTE, SHORT, INT, LONG, QUAD) or an unsigned integer (i.e., UCHAR, UBYTE, UINT, USHORT, WORD, ULONG, DWORD, UQUAD, QWORD). The data type may comprise, for example, a floating point number (i.e., DOUBLE, HFLOAT, FLOAT). The data type may comprise a new data type, such as a data type of a chosen string type, number of characters, and name. As show in Table 2 and Table 3, the data type may comprise an enum type, in which a variable may comprise one of a set of predefined constants. Table 2 and Table 3 show examples of predefined constants corresponding to message types and sensor type fields of an indication that may be sent.

TABLE 2

| Name | Value | Description |
|---|---|---|
| Supervision | 0 | Supervision message |
| State Change | 1 | State of the sensor has changed |

TABLE 3

| Type | Value | Description |
|---|---|---|
| Tilt detector | 0 | Binary tilted, not tilted sensor |
| Movement detector | 1 | Binary moving, not moving sensor |
| Inclinometer | 2 | Angle sensor |

The enum type may comprise constants or a number of constants, beyond those shown in Table 2 and Table 3. For example, the enum types may comprise another constant, such as a symbol or a character. The character may comprise an alphanumeric character, such as an integer or a letter. The enum type may indicate another data field, device, parameter, state, or position.

The data types may comprise a bitfield, in which large sets of bits may be indexed to integers and stored in a plurality of memory locations of a device. Table 4 shows an example index of integers and bits associated with sensor states.

TABLE 4

| BIT | Description |
|---|---|
| 0 | Binary tilt: 0 = horizontal, 1 = vertical |
| 1 | Binary movement: 0 = still, 1 = moving |
| 2 | Angle value changed |
| 4 | Sensor tampered (if available) |
| 5 | Low battery |
| 6-15 | Undefined, reserved for future use |

The data types may comprise a size of data in the corresponding field. For example, data in one of the fields may comprise a size of 8 bits, 16 bits, 32 bits, or another size. The bitfield may comprise integers, bits, and sensor states, beyond those shown in Table 4.

The indications may be encrypted. For example, the sensor devices 120 may encrypt the indications using an algorithm with a fixed bit key. For example, the algorithm may use a fixed 128 bit key. The key may comprise a pre-shared key, such as a key shared between the sensor devices 120 and a device receiving the indications. The key may be shared by performance of a handshake between one or more of the sensor devices 120 and the device receiving the indications. The indications may comprise data preceded by a number of random bytes. For example, the indications may comprise data preceded by four random bytes. The random bytes may be configured to require encryption in order to discern the data. The indications may comprise a cyclic redundancy code ("CRC") with a predetermined number of bits at the end. For example, the indications may comprise an eight bit CRC at the end. The CRC may be configured to enable error checking.

The sensor devices 120 may send the indication of the states or positions of the panes 110 to one or more computing devices 130. The computing device 130 may comprise a mobile device, such as a laptop computer, a cellular phone, a tablet, or an Internet of Things (IoT) device. The computing device 130 may comprise a security system device, an entertainment system device, or a home automation device. The computing device 130 may be in communication with a plurality of devices, such as security system devices, home automation devices, or premises management devices. The computing device 130 may comprise one of the sensor devices 120. The computing device 130 may comprise a gateway device. The gateway device may be configured to control and communicate with a plurality of devices, such as devices located at a premises and devices external to the premises. For example, the computing device 130 may communicate with a plurality of sensor devices 120 disposed on panes 110 of a plurality of windows 100 located at the premises. The computing device 130 may be located at a premises where the window 100 is located. The computing device 130 may be disposed on one of the panes 110 of the window 100. The computing device 130 may be located in the same room or area of the premises as the sensor devices 120. The computing device 130 may comprise a master device and the sensor devices 120 may comprise slave devices associated with the master device. The master device may be configured to control the slave devices. The master device may be configured to access data of the slave devices.

The computing device 130 may be configured to determine a state or position of the window 100 based on the states or the positions of the panes 110 or the states of the sensor devices 120. The computing device 130 may determine if the states or positions match. If at least one state or position does not match another state or position, then the computing device 130 may determine a breach in the window 100. If at least one state or position differs from another state or position by an amount exceeding a predetermined range or threshold, the computing device 130 may determine the breach in the window 100. For example, if the angle of tilt of one of the panes 110 differs from an angle of tilt of another pane 110 by more than five degrees, the computing device 130 may determine the breach in the window 100. The computing device 130 may aggregate the states or positions. The computing device 130 may determine, based on the aggregated states or positions, that an axis or plane defined by the positions of the panes 110 or sensor devices 120 has been broken. Based on the determination that the axis or plane has been broken, the computing device 130 may determine the breach. The breach may be associated with damage to the window 100 or to one or more of the panes 110. The breach may be associated with forced opening of the window 100 or one or more of the panes 110. The breach may be associated with opening of the window 100 or one or more of the panes 110 from outside the window 100 or from the exterior of the premises.

Based on the angles of tilt or rotation of panes 110, the computing device 130 may determine that the window 100 is in an open state or a closed state. For example, if the panes 110 are tilted, with respect to a reference axis, at an angle of zero degrees, the computing device 130 may determine that the window is closed. If the panes 110 are tilted, with respect to the reference axis, at an angle equal to or less than a threshold angle, the computing device 130 may determine that the window 100 is closed. The threshold angle may comprise an angle of three degrees, two degrees, or another angle. If the panes 110 are tilted, with respect to the reference axis, at an angle greater than a threshold angle, the computing device 130 may determine that the window 100 is open. The threshold angle may comprise a non-zero angle, such as an angle of three degrees, five degrees, ten degrees, or another angle. The computing device 130 may determine an amount that the window 100 is open. For example, if the panes 110, if fully open, are tilted, with respect to a reference axis, at ninety degree angles, the computing device 130 may determine that panes 110 tilted at a forty-five degree angle are half-open. Based on the determination that the panes 110 are open, the computing device 130 may determine a breach in the window 100. The computing device 130 may determine a change in the state or position of the panes 110. For example, the computing device 130 may determine that one or more of the panes 110 have switched from a closed state to an open state. Based on the change in the state or position of the panes 110, the computing device 130 may determine a breach in the window 100. Based on the states or positions of the panes 110 or the sensor devices 120, the computing device 130 may determine a tampered state of at least one of the panes 110 or the sensor devices 120. The computing device 130 may determine a tampered state based on a determination that an indication was not received from one or more of the sensor devices 120. The tampered state may be associated with damage to or disabling of one or more of the panes 110 or the sensor devices 120.

The computing device 130 may receive indications of states or positions of sensor devices 120 and panes 110 of a plurality of windows 100. Based on the indications, the computing device 130 may determine the states or positions of the plurality of windows 100. The computing device 130 may compare the states or positions of the plurality of windows 100. Based on a determination that the state or position of a windows 100 differs from the state or position of another window 100, the computing device 130 may determine a breached state or a tampered state of one or more of the windows 100.

Based on the determination of the breached state or the tampered state, the computing device 130 may trigger an alert (e.g., trigger an alarm, generate a noise, transmit a notification, initiate a communication, etc.). For example, the computing device 130 may trigger an alarm (e.g., lights, noise, etc.) at a premises. As another example, the computing device 130 may transmit a notification of a breach to a device associated with a response team (e.g., police office, security guard, fire department, etc.). As another example, the computing device 130 may transmit a notification of a breach to a user device (e.g., a mobile device, a set-top box, etc.). The notification and/or communication may comprise information regarding the breach (e.g., the window 100 breached, the room comprising the window 100 breached, the premises comprising the window 100 breached, the time the breach occurred, the one or more sensor devices 120 indicating the breach, the pane 110 breached/tampered, the one or more sensor devices tampered etc.).

The computing device 130 may be configured to send an indication of the determined state or position of the window. The computing device 130 may be configured to send the indication via Wi-Fi, Bluetooth, Zigbee, telephone service, radio frequency, a proprietary protocol, or another communication protocol. For example, the computing device 130 may send the indication of the state or position to another computing device, such as a device located at the premises or a device external to the premises. The computing device 130 may be configured to send data configured to cause output of the indication of the state or position, such as via a user interface or a touchscreen. The computing device 130 may be in communication with or comprise a touchscreen, a display, or an output peripheral. The computing device 130 may cause output of the indication of the state or the position via the touchscreen, the display, or the output peripheral.

The computing device 130 may be in communication with sensor devices 120 on panes of a plurality of windows 100. For example, the sensor devices 120 may be disposed on panes of a plurality of windows 100 located at a premises. The computing device 130 may be located at the premises. A plurality of computing devices 130 may be located at the premises. Each of the plurality of computing devices 130 may communicate with a subset of the sensor devices 120. For example, each computing device 130 may communicate with sensor devices 120 on panes 110 of one of the plurality of windows 100. As another example, each computing device 130 may communicate with sensor devices 120 on panes 110 of windows 100 located in a room or an area of the premises. The computing device 130 may be located in the room or area of the premises.

The computing device 130 may be configured to determine the subset of the plurality of sensor devices 120. The computing device 130 may switch to a pairing mode, such as from another operational mode. The computing device 130 may be configured to switch to the pairing mode responsive to receiving an indication to switch to the pairing mode. The indication to switch to the pairing mode may comprise a user input. The user input may comprise, as an example, a push of a button on the computing device 130. The user input may comprise, as another example, a selection or interaction with an icon on a graphic user interface of touchscreen of the computing device 130 or a touchscreen device in communication with the computing device 130.

The computing device 130 may be configured to indicate that the computing device 130 is in the pairing mode. For example, the computing device 130 may cause a light on the computing device 130 or in communication with the computing device 130 to illuminate or blink. As another example, the computing device may send an indication that the computing device 130 is in the pairing mode.

In the pairing mode, the computing device 130 may be configured to receive signals from the plurality of sensor devices 120. The sensor devices 120 may be caused to send the signals. For example, the states or positions of the panes 110 of one or more of the windows 100 may be changed. The sensor devices 120 may be configured to send the signals based on the changed states or positions. The signals may comprise indications of the states or positions of the panes 110.

The computing device 130 may be configured to switch to another operation mode from the pairing mode. The computing device 130 may switch from the pairing mode after a period of time. The computing device 130 may switch from the pairing mode in response to an indication to switch from the pairing mode. The indication may comprise a user input. For example, the user input may comprise a pressing of a button on the computing device 130. The button may comprise the same button for entering the pairing mode. As an example, a press of the button for a period of time that complies with a time threshold may indicate the pairing mode. A press of the button for a period of time that exceeds the time threshold may indicate switching from the pairing mode to another operational mode. The user input may comprise, as another example, a selection or interaction with an icon on a graphic user interface of touchscreen of the computing device 130 or a touchscreen device in communication with the computing device 130. The icon may comprise the same icon for entering the pairing mode.

The computing device 130 may determine the subset of the plurality of sensor devices 120 based on the signals received in the pairing mode. The subset of the plurality of sensor devices 120 may comprise sensor devices 120 from which the most signals were received during the time period. The subset may comprise a number of the sensor devices 120 from which the most signals were received. For example, the subset may comprise the five sensor devices 120, the ten sensor devices 120, or another number of sensor devices 120 from which the most signals were received. The number may be associated with a number of panes 110 of one of the windows 100. The number may be associated with a number of sensor devices 120 on panes 110 of one of the windows 100. The subset may comprise sensor devices 120 from which a quantity of signals was received meeting or exceeding a threshold number. For example, if the threshold number is three signals, the subset may comprise sensor devices 120 from which three or more signals were received.

The computing device 130 may be located in the one of the plurality of distinct zones. The computing device 130 may be configured to determine, based on the number of signals received from the each of the plurality of sensor devices 120, that the subset of the sensor devices 120 is located in the one of the plurality of distinct zones. For example, the computing device 130 may not receive signal from sensor devices 120 that are located external to the one of the distinct zones. The computing device 130 may receive a greater number of signals from sensor devices 120 that are located in the one of the plurality of distinct zones than from sensor devices 120 that are located external to the one of the plurality of sensor devices 120. The subset of the plurality of sensor devices 120 may be determined based on strengths of the signals received. The computing device 130 may compare the strength of the signals received. The subset may comprise the sensor devices 120 from which signals with the strongest signals were received.

Based on the determination of the subset of the plurality of sensor devices 120, the computing device 130 may enable communications between the determined subset and the computing device 130. For example, the computing device 130 may perform a handshake process with the determined subset of the plurality of sensor devices 120. The handshake protocol may comprise sending, to the subset of the plurality of sensor devices 120, an indication of communication parameters, such as an encryption protocol, a transfer rate, a coding alphabet, a parity, an interrupt procedure, and other parameters. The subset of the plurality of sensor devices 120 may send, to the computing device 130, a confirmation of the communication parameters. The subset of the plurality of sensor devices 120 may use the communication parameters to communicate with the computing device 130.

The computing device 130 may enable communications with the determined subset of the plurality of sensor devices 120 by modifying a sensitivity of a receiver of the computing device 130. The computing device 130 may modify a sensitivity of the receiver based on strengths of the signals received from the determined subset of the plurality of sensor devices 120. For example, the computing device 130 may modify the sensitivity of the receiver to exclude signals from sensor devices 120 that are not in the determined subset of sensor devices 120.

Figure 2:
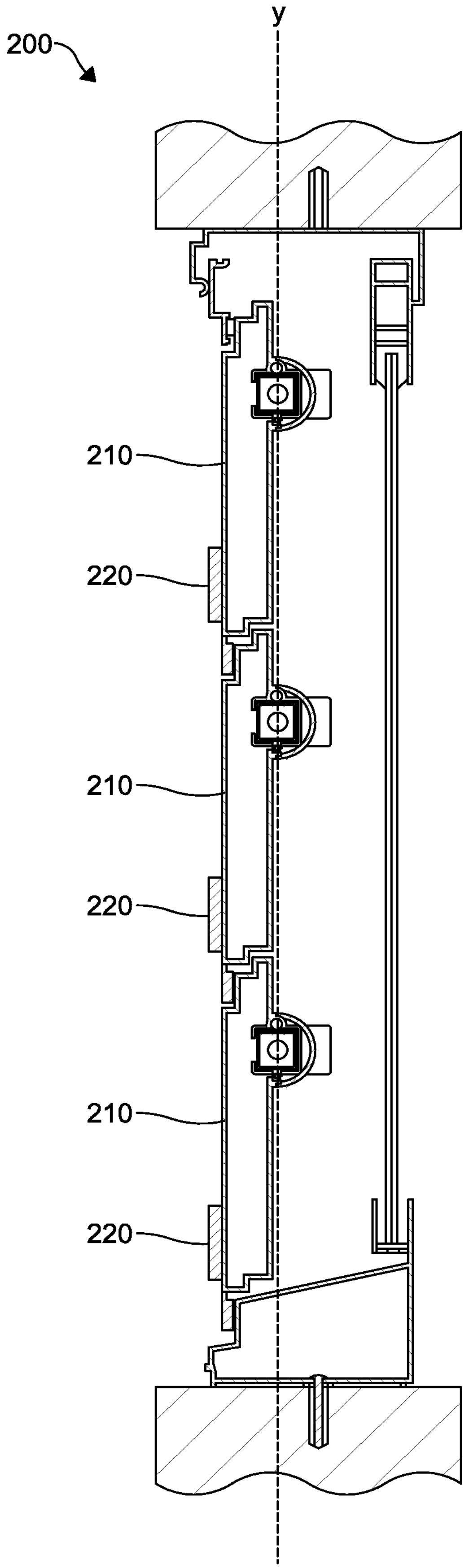
FIG. 2 is a diagram of an example system.

FIG. 2 shows an example structure with moveable components comprising a window 200. However, the disclosed system may secure another structure with moveable components, such as a door or a vent. The window 200 may comprise a plurality of moveable components, such as panes 210. However, the system disclosed may secure a window with different moveable components, such as slats. The panes 210 may be in a closed position. A plurality of sensor devices 220 may be disposed on the panes 210. The sensor devices 220 may be similar to the sensor devices 120 in FIG. 1. The sensor devices 220 may determine that the panes 210 are in the closed position. The sensor devices 220 may determine an angle of tilt of the panes 210 with respect to a reference axis, such as the fixed reference axis "y." Axis y may comprise a gravitational axis, for example. The sensor devices 220 may determine that the angle, with respect to the axis y, of the panes 210 equals zero degrees. Based on the determination that the angle is zero degrees, the sensor devices 220 may determine that the panes 210 are in closed positions. The sensor devices 120 may send an indication of the closed positions of the panes 210 or the zero angle. For example, the sensor devices 220 may send the indication to a computing device, like the computing device 130 in FIG. 1.

Figure 3:
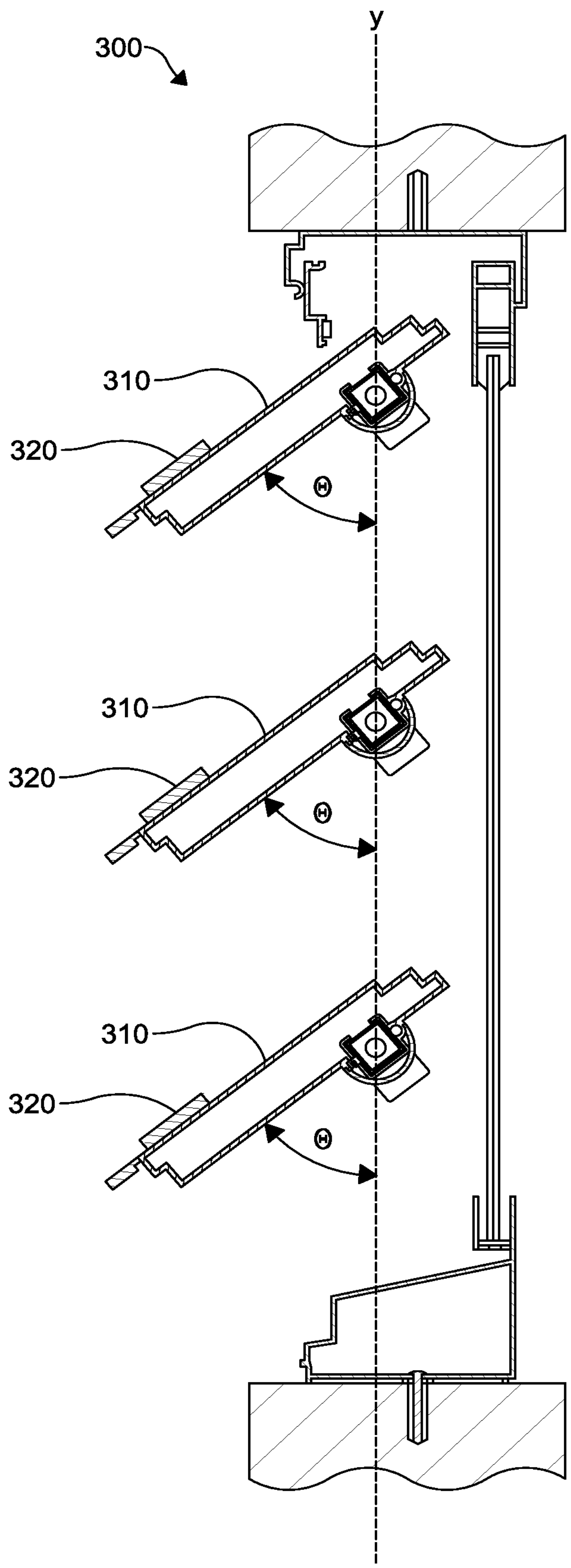
FIG. 3 is a diagram of an example system.

FIG. 3 shows an example structure with moveable components comprising a window 300. However, the disclosed system may secure another structure with moveable components, such as a door or a vent. The window 300 may comprise a plurality of moveable components, such as panes 310. However, the disclosed system may secure a window with other moveable components, such as slats or louvers. The panes 310 may be in an open position. A plurality of sensor devices 320 may be disposed on the panes 310. The sensor devices 320 may be similar to the sensor devices 120 in FIG. 1. The sensor devices 320 may determine that the panes 310 are in the open position. The sensor devices 320 may determine an angle of tilt θ of the panes 310 with respect to a reference axis, such as the fixed reference axis "y." Axis y may comprise a gravitational axis, for example. Based on the determination of the angle θ, the sensor devices 320 may determine that the panes 310 are in open positions. The sensor devices 320 may determine that the angle θ exceeds a threshold angle. The sensor devices 320 may determine the open positions of the panes 310 based on the determination that the angle θ exceeds the threshold angle. As an example, a pane 310 that is at an angle θ with respect to the fixed axis y within zero to five degrees may indicate a closed state of the pane 310. An another example, a pane 310 that is at an angle Θ with respect to the fixed axis y that is greater than five degrees may indicate an open state of the pane 310. As a further example, a pane 310 that is at an angle Θ with respect to the fixed axis y that is greater than ninety degrees may indicate a breached state of the pane 310. The sensor devices 320 may send an indication of the closed positions of the panes 310 or the zero angle. For example, the sensor devices 320 may send the indication to a computing device, like the computing device 130 in FIG. 1.

Figure 4:
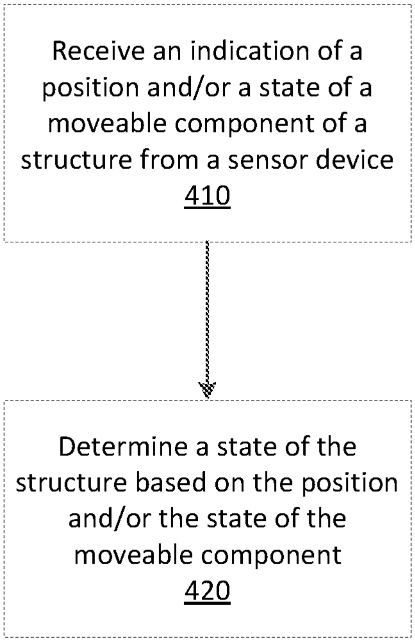
FIG. 4 is a flow diagram of an example method.

FIG. 4 shows an example method for securing structures with moveable components. At step 410, an indication of a position or state of a moveable component of a structure may be received from a sensor device. The sensor device may be similar to any of sensor devices 120 in FIG. 1, 220 in FIG. 2, or 320 in FIG. 3. The sensor device may be disposed on or coupled to the moveable component. The moveable component may comprise a pane, a slat, or a louver, as examples. The structure may comprise a window, such as the window 100 in FIG. 1, for example. The window may comprise a jalousie window or a louver window. The structure may comprise a door or a vent, as examples. The sensor device may be configured to determine the position or state of the moveable component. The state of the moveable component may comprise a moving state, a stationary state, an open state, a fully open state, a partially open state, a closed state, a breached state, or a tampered state, as examples. The position of the moveable component may comprise an orientation of the moveable component, such as with respect to one or more axis or planes. The axis or plane may comprise one or more reference axis or planes. For example, the axis may comprise a magnetic axis or a gravitational axis. The axis or plane may comprise an axis or plane defined by the position of the moveable components of the structure, by the position of sensor devices on the moveable components of the structure, or by a position or orientation of the structure. For example, the sensor devices may be arranged on the moveable components such that they are in a line or other geometric configuration. The orientation of the moveable component may comprise an angle of tilt or rotation with respect to the axis or plane.

The indication of the position or state of the moveable component may comprise binary information. For example, the indications of the state or position may comprise an indication of either an "open" state or a "closed" state. As another example, the indication of the state or position may comprise an indication of either a "moving" state or a "non-moving" state. The sensor device may be configured to send the indication of the state or the position in response to being polled. The indication of the state or position may comprise an indication of a measurement of angles of tilt or rotation of the moveable components with respect to a reference axis or plane. The indication of the state or position may comprise an indication of a direction or speed of movement of the moveable component. The indication of the state or position may comprise an indication of a power or communication state of the sensor device. The indication may comprise one or more data fields and data field types, such as the example data fields and data field types in Table 1.

The indication of the position or state of the moveable component may be received by a computing device. The computing device may similar to computing device 130 in FIG. 1. The indication of the position or the state of the moveable component may be received via Wi-Fi, Zigbee, Bluetooth, a proprietary protocol, or another communication protocol. The computing device may comprise a mobile device, such as a laptop computer, a cellular phone, a tablet, or an Internet of Things (IoT) device. The computing device may comprise a security system device, an entertainment system device, or a home automation device. The computing device may be in communication with a plurality of devices, such as security system devices, home automation devices, or premises management devices. The computing device may comprise one of the sensor devices on the moveable components of the structure. The computing device may comprise a gateway device. The gateway device may be configured to control and communicate with a plurality of devices, such as devices located at a premises and devices external to the premises. For example, the computing device may communicate with a plurality of sensor devices disposed on moveable components of a plurality of structures located at the premises. The computing device may be located at a premises where the structure is located. The computing device may be disposed on one of the moveable components of the structure. The computing device may be disposed on the structure. The computing device may be located in the same room or area of the premises as the sensor device.

At step 420, a state of the structure may be determined based on the state or position of the moveable component. For example, the computing device may be configured to determine, based at least on the position or the state of the moveable component, a state of the structure. The state of the structure may comprise at least one of an open state, a closed state, a partially open state, a partially closed state, an opening angle, a breached state, a tampered state, or a malfunctioning state.

Based on the angle of tilt or rotation of the moveable component, the computing device may determine that the structure is in an open state or a closed state. For example, if the moveable component is tilted, with respect to a reference axis, at an angle of zero degrees, the computing device may determine that the structure is closed. If the moveable component is tilted, with respect to the reference axis, at an angle equal to or less than a threshold angle, the computing device may determine that the structure is closed. The threshold angle may comprise an angle of three degrees, two degrees, or another angle. If the moveable component is tilted, with respect to the reference axis, at an angle greater than a threshold angle, the computing device may determine that the structure is open. The threshold angle may comprise a non-zero angle, such as an angle of three degrees, five degrees, ten degrees, or another angle. The computing device may determine an amount that the structure is open. For example, if the moveable component, if fully open, is tilted, with respect to a reference axis, at ninety degree angles, the computing device may determine that moveable component tilted at a forty-five degree angle is half-open. Based on the determination that the moveable component is open, the computing device may determine a breach in the structure. The computing device may determine a change in the state or position of the moveable component. For example, the computing device may determine that the moveable component has changed from a closed state to an open state. Based on the change in the state or position of the moveable component, the computing device may determine a breach in the structure. Based on the state or position of the moveable component, the computing device may determine a tampered state of the moveable component. The computing device may determine a tampered state based on a determination that an indication was not received from the sensor device. The tampered state may be associated with damage to or disabling of the moveable component or the sensor device.

If the computing device determines that the structure is breached or tampered, the computing device may trigger an alert (e.g., trigger an alarm, generate a noise, transmit a notification, initiate a communication, etc.). For example, the computing device may trigger an alarm (e.g., lights, noise, etc.) at a premises. As another example, the computing device may transmit a notification of a breach to a device associated with a response team (e.g., police office, security guard, fire department, etc.). As another example, the computing device may transmit a notification of a breach to a user device (e.g., a mobile device, a set-top box, etc.). The notification and/or communication may comprise information regarding the breach (e.g., the structure breached, the room comprising the structure breached, the premises comprising the structure breached, the time the breach occurred, the sensor device indicating the breach, the moveable component breached/tampered, the one or more sensor devices tampered etc.).

The computing device may send an indication of the determined state or position of the structure. The computing device may send the indication via Wi-Fi, Bluetooth, Zigbee, telephone service, radio frequency, a proprietary protocol, or another communication protocol. For example, the computing device may send the indication of the state or position to another computing device, such as a device located at the premises or a device external to the premises. The computing device may send data configured to cause output of the indication of the state or position, such as via a user interface or a touchscreen. The computing device may be in communication with or comprise a touchscreen, a display, or an output peripheral. The computing device may cause output of the indication of the state or the position via the touchscreen, the display, or the output peripheral.

Figure 5:
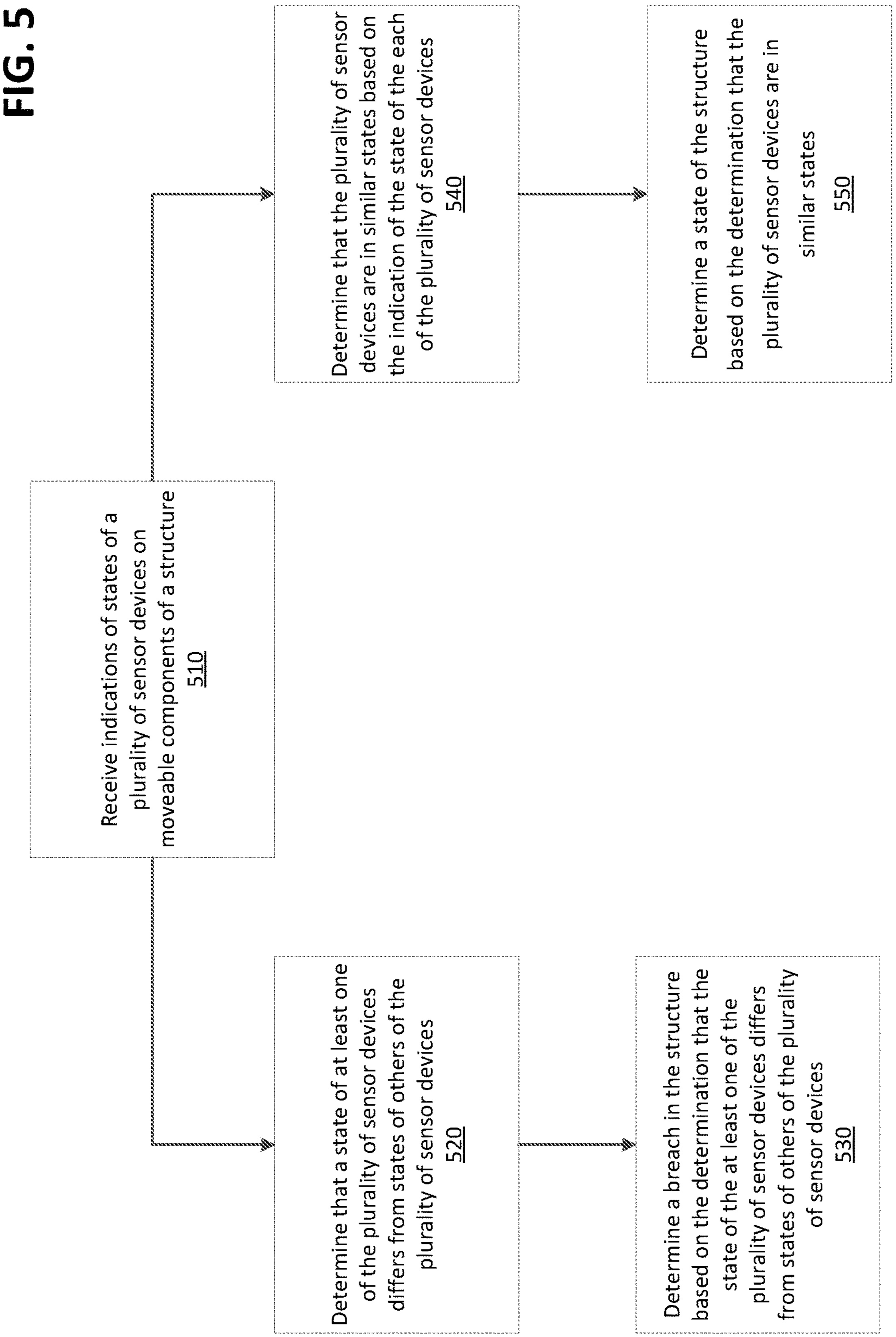
FIG. 5 is a flow diagram of an example method.

FIG. 5 shows an example method for securing structures with moveable components. At step 510, indications of states of a plurality of sensor devices on moveable components of a structure may be received. The sensor devices may be similar to any of sensor devices 120 in FIG. 1, 220 in FIG. 2, or 320 in FIG. 3. The sensor devices may be disposed on the moveable components. The structure may comprise a window, a door, or a vent, as examples. The structure may comprise a jalousie window or a louver window, as examples. The sensor devices may be configured to determine the positions or states of the moveable components. The states of the moveable component may comprise moving states, stationary states, open states, fully open states, partially open states, closed states, breached states, or tampered states, as examples. The positions of the moveable component may comprise orientations of the moveable components, such as with respect to one or more axis or planes. The axis or plane may comprise one or more reference axis or planes. For example, the axis may comprise a magnetic axis or a gravitational axis. The axis or plane may comprise an axis or plane defined by the position of the moveable components of the structure, by the position of the sensor devices on the moveable components of the structure, or by a position or orientation of the structure. For example, the sensor devices may be arranged on the moveable components such that they are in a line or other geometric configuration. The orientation of the moveable components may comprise angles of tilt or rotation with respect to the axis or plane.

The indications of the states may comprise binary information. For example, the indications of the states may comprise indications of either a "tilted" state or a "non-tilted" state. As another example, the indications of the states may comprise indications of either a "moving" state or a "non-moving" state. The sensor devices may be configured to send the indications of the states in response to being polled. The indications of the states may comprise indications of power or communication states of the sensor devices. The indications may comprise one or more data fields and data field types, such as the example data fields and data field types in Table 1.

The indications of the states may be received by a computing device. The computing device may similar to computing device 130 in FIG. 1. The indication of the states may be received via Wi-Fi, Zigbee, Bluetooth, a proprietary protocol, or another communication protocol. The computing device may comprise a mobile device, such as a laptop computer, a cellular phone, a tablet, or an Internet of Things (IoT) device. The computing device may comprise a security system device, an entertainment system device, or a home automation device. The computing device may be in communication with a plurality of devices, such as security system devices, home automation devices, or premises management devices. The computing device may comprise one of the sensor devices on the moveable components of the structure. The computing device may comprise a gateway device. The gateway device may be configured to control and communicate with a plurality of devices, such as devices located at a premises and devices external to the premises. For example, the computing device may communicate with a plurality of sensor devices disposed on moveable components of a plurality of structures located at the premises. The computing device may be located at a premises where the structure is located. The computing device may be disposed on one of the moveable components of the structure. The computing device may be disposed on the structure. The computing device may be located in the same room or area of the premises as the sensor device.

At step 520, a determination may be made that a state of at least one of the plurality of sensor devices differs from states of others of the plurality of sensor devices. For example, the computing device may determine that a state of at least one of the plurality of sensor devices differs from states of others of the plurality of sensor devices based on the indications of the states of the plurality of sensor devices at step 510. Determining that the state of the at least one of the plurality of sensor devices differs from the states of the others of the plurality of sensor devices may comprise determining that the tilt of the at least one of the plurality of moveable components coupled to the at least one of the plurality of sensor devices differs from tilts of others of the plurality of moveable components. Determining that the state of the at least one of the plurality of sensor devices differs from the states of the others of the plurality of sensor devices may comprise determining that the angle of tilt of the at least one of the plurality of moveable components coupled to the at least one of the plurality of sensor devices deviates from angles of tilt of others of the plurality of moveable components by an amount that exceeds a threshold. As an example, if an angle of tilt of a moveable component differs from the angle of tilt of another moveable component by more than 5 degrees, a difference may be determined. However, the threshold angle may comprise another angle, such as 10 degrees, 15 degrees, 20 degrees, or 25 degrees, for example. The angles of tilt of the plurality of moveable components may comprise angles with respect to a fixed axis. The angles of tilt of the plurality of moveable components may comprise angles with respect to an array formed by the plurality of moveable components. The determining that the state of the at least one of the plurality of sensor devices differs from the states of the others of the plurality of sensor devices may comprise determining that movement of the at least one of the plurality of moveable components is different than movement of others of the plurality of moveable components.

At step 530, a breach in the structure may be determined based on the determination that the state of the at least one of the plurality of sensor devices differs from states of others of the plurality of sensor devices. For example, the computing device may determine, based on the indication of the state of the each of the plurality of sensor devices, a breach in the structure. The determining the breach in the structure may be further based on at least one of a size, a number, or a spacing of the plurality of moveable components.

Based on the determination of the breach, an alert may be triggered. The computing device may trigger the alert (e.g., trigger an alarm, generate a noise, transmit a notification, initiate a communication, etc.). For example, the computing device may trigger an alarm (e.g., lights, noise, etc.) at a premises. As another example, the computing device may transmit a notification of a breach to a device associated with a response team (e.g., police office, security guard, fire department, etc.). As another example, the computing device may transmit a notification of a breach to a user device (e.g., a mobile device, a set-top box, etc.). The notification and/or communication may comprise information regarding the breach (e.g., the structure breached, the room comprising the structure breached, the premises comprising the structure breached, the time the breach occurred, the sensor device indicating the breach, the moveable component breached/tampered, the one or more sensor devices tampered etc.).

At step 540, a determination may be made that the plurality of sensor devices are in similar states based on the indication of the state of each of the plurality of sensor devices. For example, the tilt aggregator device may determine that the plurality of sensor devices are in similar states based on the indication of the state of the each of the plurality of sensor devices.

At step 550, a state of the structure may be determined based on the determination that the plurality of sensor devices are in similar states. For example, the computing device may determine, based on the determination that the plurality of sensor devices are in similar states, a state of the structure, wherein the state of the structure is associated with opening or closing of the structure.

Based on the determined state of the structure, an indication of the determined state of the structure may be sent. The computing device may send the indication of the determined state of the structure. The computing device may send the indication via Wi-Fi, Bluetooth, Zigbee, telephone service, radio frequency, a proprietary protocol, or another communication protocol. For example, the computing device may send the indication of the state to another computing device, such as a device located at the premises or a device external to the premises. The computing device may send data configured to cause output of the indication of the state, such as via a user interface or a touchscreen. The computing device may be in communication with or comprise a touchscreen, a display, or an output peripheral. The computing device may cause output of the indication of the state via the touchscreen, the display, or the output peripheral.

Figure 6:
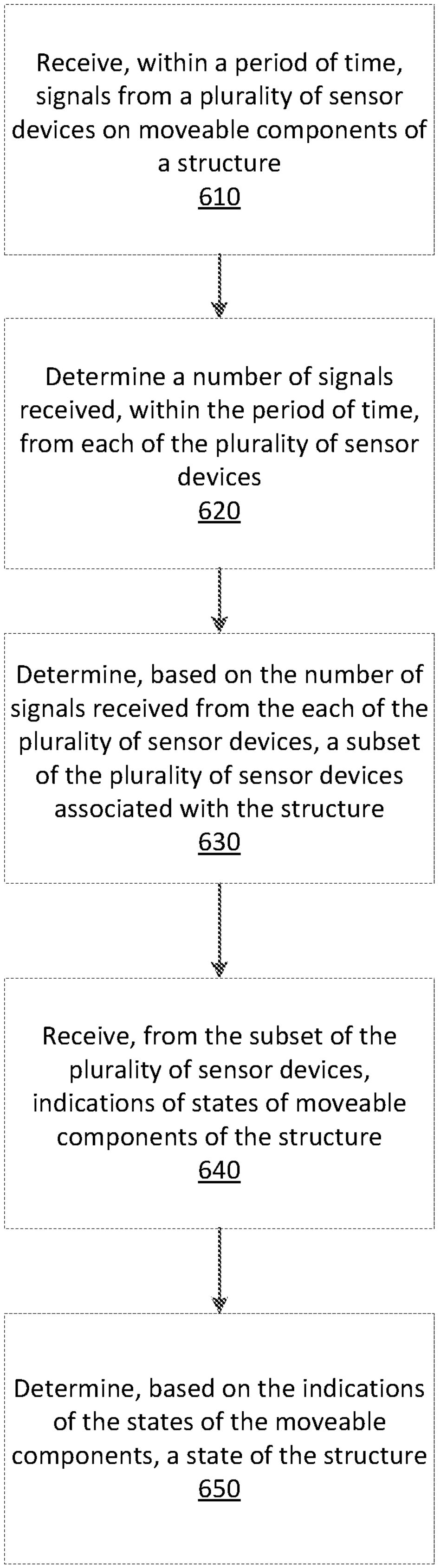
FIG. 6 is a flow diagram of an example method.

FIG. 6 shows an example method for securing structures with moveable components. At step 610, signals may be received from a plurality of sensor devices. The sensor devices may be similar to any of sensor devices 120 in FIG. 1, 220 in FIG. 2, or 320 in FIG. 3. The sensor devices may be disposed on moveable components of one or more structures. The structures may be like the window 100 in FIG. 1. The structures may comprise jalousie windows or louver windows, as examples. The structures may comprise doors or vents, as examples. The structures may be located at a premises. The structures may be located in a room or an area of the premises. The structures may be located in different rooms or areas of the premises. The sensor devices may be configured to determine the positions or states of the moveable components of the structures.

A computing device may receive, from the plurality of sensor devices and within a period of time, signals at step 610. The computing device may be similar to computing device 130 in FIG. 1. The computing device may comprise a mobile device, such as a laptop computer, a cellular phone, a tablet, or an Internet of Things (IoT) device. The computing device may comprise a security system device, an entertainment system device, or a home automation device. The computing device may be in communication with a plurality of devices, such as security system devices, home automation devices, or premises management devices. The computing device may comprise one of the sensor devices. The computing device may comprise a gateway device. The gateway device may be configured to control and communicate with a plurality of devices, such as devices located at the premises and devices external to the premises. The computing device may be located at the premises where the structures may be located. The computing device may be disposed on one of the moveable components of the structures. The computing device may be disposed on one of the structures. The computing device may be located in the same room or area of the premises as the sensor devices.

The computing device may receive the signals via Wi-Fi, Zigbee, Bluetooth, a proprietary protocol, or another communication protocol. The computing device may be configured to receive an indication of a pairing mode. The computing device may receive the indication from another device. The computing device may receive the indication via Wi-Fi, Zigbee, Bluetooth, a proprietary protocol, or another communication protocol. The indication may comprise a user input. The computing device may receive the user input via a user interface. The computing device may comprise the user interface or may be in communication with the user interface. The user interface may comprise, for example, a button, a touchscreen, a graphic user interface, or an application interface on a user device. The computing device may be configured to switch, based on the indication of the pairing mode, to the pairing mode. Based on the indication of the pairing mode, the computing device may send an indication of the pairing mode to the sensor devices. For example, the computing device may send, to the sensor devices, one or more requests for the sensor devices to send the signals. As another example, the computing device may poll the sensor devices. The sensor devices may send the signals in response to the indication of the pairing mode.

The period of time may comprise a time that the computing device is in the pairing mode. The pairing mode may be associated with configuration of the computing device to pair with a subset of the sensor devices. For example, in the pairing mode, the computing device may be configured to pair with sensor devices that are disposed on moveable components of one structure of the structures. The computing device may be configured to pair with sensor devices that are in a room or area of the premises. Pairing may comprise determining the subset of sensor devices. Pairing may comprise saving an indication of the subset of the sensor devices. Pairing may comprise establishing a communication channel with the subset of the devices.

At step 620, a quantity of signals received from each of the plurality of sensor devices may be determined. The quantity of signals received from each of the plurality of sensor devices may be determined within the period of time. The computing device may determine the quantity of signals received from each of the plurality of sensor devices. For example, the computing device may determine the quantity of signals received from each of the plurality of sensor devices while the computing device is in the pairing mode.

At step 630, a subset of the plurality of sensor devices associated with the one or more of the plurality of structures may be determined. The subset may be determined based on the quantity of signals received from each of the plurality of sensor devices. For example, the computing device may determine, based on the quantity of signals received from the each of the plurality of sensor devices, the subset of the plurality of sensor devices.

The subset of the plurality of sensor devices may comprise sensor devices from which the most signals were received during the period of time. The subset may comprise a number of the sensor devices from which the most signals were received. For example, the subset may comprise the five sensor devices, the ten sensor devices, or another number of sensor devices from which the most signals were received. The number may be associated with a number of moveable components of one of the structures. The number may be associated with a number of sensor devices on moveable components of one of the structures. The subset may comprise sensor devices from which a quantity of signals was received meeting or exceeding a threshold quantity. For example, if the threshold quantity is three signals, the subset may comprise sensor devices from which three or more signals were received.

The computing device may be located in the one of the plurality of distinct zones. The computing device may be configured to determine, based on the quantity of signals received from the each of the plurality of sensor devices, that the subset of the sensor devices is located in the one of the plurality of distinct zones. For example, the computing device may not receive signal from sensor devices that are located external to the one of the distinct zones. The computing device may receive a greater quantity of signals from sensor devices that are located in the one of the plurality of distinct zones than from sensor devices that are located external to the one of the plurality of sensor devices. The subset of the plurality of sensor devices may be determined based on strengths of the signals received. The computing device may compare the strength of the signals received. The subset may comprise the sensor devices from which signals with the strongest signals were received.

Based on the determination of the subset of the plurality of sensor devices, the computing device may enable communications between the determined subset and the computing device. For example, the computing device may perform a handshake process with the determined subset of the plurality of devices. The handshake protocol may comprise sending, to the subset of the plurality of sensor devices, an indication of communication parameters, such as an encryption protocol, a transfer rate, a coding alphabet, a parity, an interrupt procedure, and other parameters. The subset of the plurality of devices may send, to the computing device, a confirmation of the communication parameters. The subset of the plurality of sensor devices may use the communication parameters to communicate with the computing device.

The computing device may enable communications with the determined subset of the plurality of sensor devices by modifying a sensitivity of a receiver of the computing device. The computing device may modify a sensitivity of the receiver based on strengths of the signals received from the determined subset of the plurality of sensor devices. For example, the computing device may modify the sensitivity of the receiver to exclude signals from sensor devices that are not in the determined subset of sensor devices.

At step 640, indications of states or positions of moveable components of the one or more of the plurality of structures may be received from the subset of the plurality of sensor devices. For example, the computing device may receive, from the subset of the plurality of sensor devices, indications of states or positions of moveable components of the one or more of the plurality of structures. The computing device may receive the indications responsive to enabling communications between the computing device and the determined subset of the plurality of sensor devices.

The indications of the positions or states of the moveable components may comprise binary information. For example, the indications of the states or positions may comprise indications of either an "open" state or a "closed" state. As another example, the indications of the states or positions may comprise indications of either a "moving" state or a "non-moving" state. The sensor devices may be configured to send the indications of the states or the positions in response to being polled. The indications of the states or positions may comprise indications of measurements of angles of tilt or rotation of the moveable components with respect to a reference axis or plane. The indications of the states or positions may comprise indications of directions or speeds of movements of the moveable components. The indications of the states or positions may comprise indications of power or communication states of the sensor devices. The indications may comprise one or more data fields and data field types, such as the example data fields and data field types in Table 1.

At step 650, a state of the one or more of the plurality of structures may be determined. The state of the one or more of the plurality of structures may be determined based on the indications of the states of the moveable components. The computing device may be configured to determine, the state of the one or more of the plurality of structures. The state of the structure may comprise at least one of an open state, a closed state, a partially open state, a partially closed state, an opening angle, a breached state, a tampered state, or a malfunctioning state.

Based on the angles of tilt or rotation of moveable components, the computing device may determine that the structure is in an open state or a closed state. For example, if the moveable components are tilted, with respect to a reference axis, at angles of zero degrees, the computing device may determine that the structure is closed. If the moveable components are tilted, with respect to the reference axis, at angles equal to or less than a threshold angle, the computing device may determine that the structure is closed. The threshold angle may comprise an angle of three degrees, two degrees, or another angle. If the moveable components are tilted, with respect to the reference axis, at angles greater than a threshold angle, the computing device may determine that the structure is open. The threshold angle may comprise a non-zero angle, such as an angle of three degrees, five degrees, ten degrees, or another angle. The computing device may determine an amount that the structure is open. For example, if the moveable components are fully open, are tilted, with respect to a reference axis, at ninety degree angles, the computing device may determine that moveable components tilted at a forty-five degree angle are half-open. Based on the determination that the moveable components are open, the computing device may determine a breach in the structure. The computing device may determine a change in the states or positions of the moveable components. For example, the computing device may determine that the moveable components have changed from a closed state to an open state. Based on the change in the states or positions of the moveable components, the computing device may determine a breach in the structure. Based on the states or positions of the moveable component, the computing device may determine a tampered state of one or more of the moveable components. The computing device may determine a tampered state based on a determination that an indication was not received from one of the subset of sensor devices. The tampered state may be associated with damage to or disabling of the moveable component or the sensor device.

If the computing device determines that the structure is breached or tampered, the computing device may trigger an alert (e.g., trigger an alarm, generate a noise, transmit a notification, initiate a communication, etc.). For example, the computing device may trigger an alarm (e.g., lights, noise, etc.) at a premises. As another example, the computing device may transmit a notification of a breach to a device associated with a response team (e.g., police office, security guard, fire department, etc.). As another example, the computing device may transmit a notification of a breach to a user device (e.g., a mobile device, a set-top box, etc.). The notification and/or communication may comprise information regarding the breach (e.g., the structure breached, the room comprising the structure breached, the premises comprising the structure breached, the time the breach occurred, the sensor device indicating the breach, the moveable component breached/tampered, the one or more sensor devices tampered etc.).

The computing device may send an indication of the determined states or positions of the structure. The computing device may send the indication via Wi-Fi, Bluetooth, Zigbee, telephone service, radio frequency, a proprietary protocol, or another communication protocol. For example, the computing device may send the indication of the states or positions to another computing device, such as a device located at the premises or a device external to the premises. The computing device may send data configured to cause output of the indication of the states or positions, such as via a user interface or a touchscreen. The computing device may be in communication with or comprise a touchscreen, a display, or an output peripheral. The computing device may cause output of the indication of the states or the positions via the touchscreen, the display, or the output peripheral.

Figure 7:
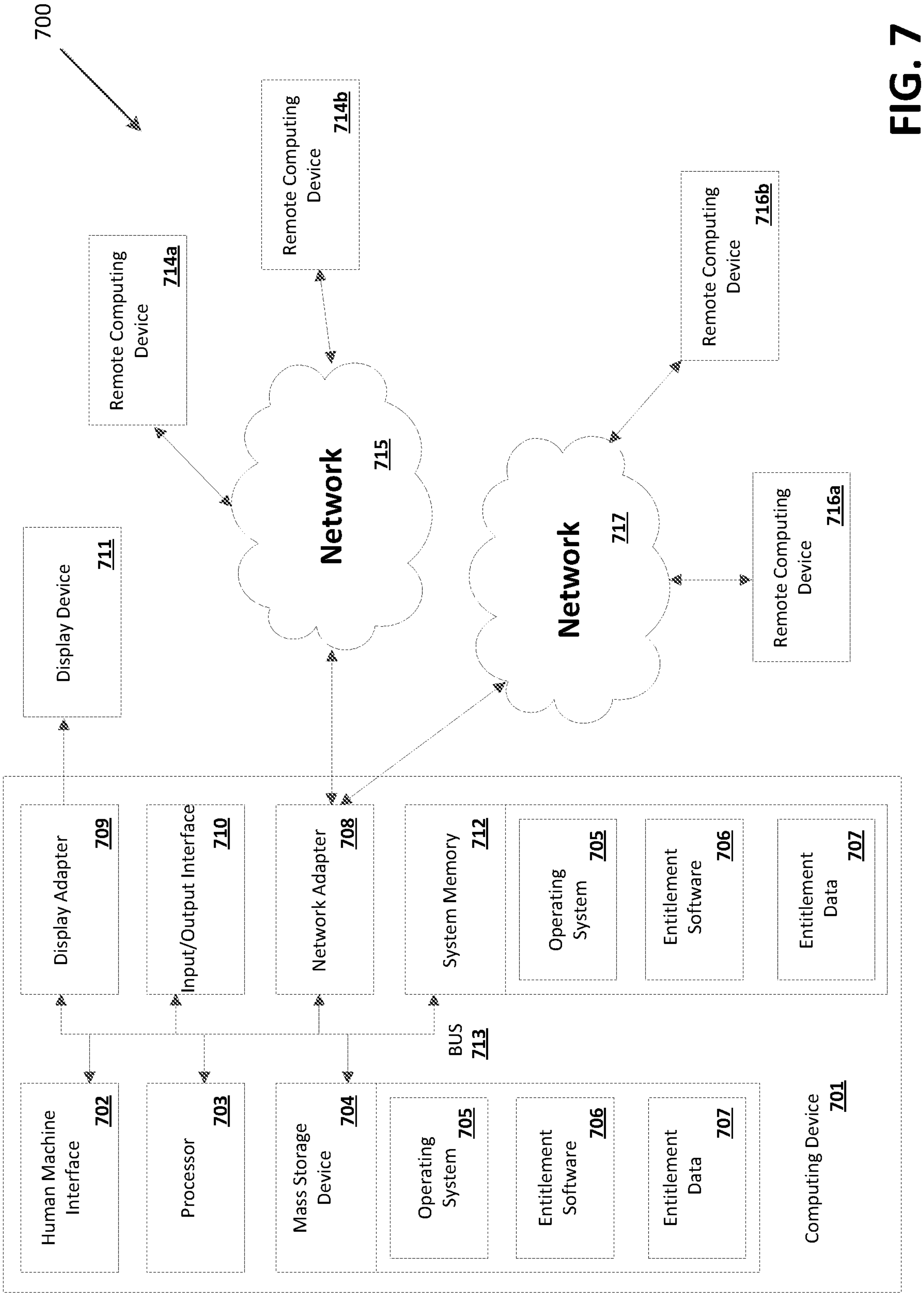
FIG. 7 is a diagram of an example system.

FIG. 7 shows an example computing device 701. The computing device may be like the computing device 130 in FIG. 1. The computing device may be in communication with a plurality of sensor devices disposed on moveable components of a structure, such as the sensor devices 120 in FIG. 1. The components of the computing device 701 may comprise, but are not limited to, one or more processors or processing units 703, a system memory 712, and a system bus 713 that couples various system components including the processing unit 703 to the system memory 712. In the case of multiple processing units 703, the system may utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 713, and all buses specified in this description may also be implemented over a wired or wireless network connection and each of the subsystems, including the processing unit 703, a mass storage device 704, an operating system 705, a service software 706, a service data 707, a network adapter 708, system memory 712, an input/output interface 710, a display adapter 709, a display device 711, and a human machine interface 702, may be contained within one or more local computing devices 716*a,b* or remote computing devices 714*a,b* at physically separate locations, connected through buses of this form, in effect implementing a fully distributed system.

The computing device 701 may comprise a variety of computer readable media. Example readable media may comprise any available media that is accessible by the computing device 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as service data 707 and/or program modules such as operating system 705 and service software 706 that are immediately accessible to and/or are presently operated on by the processing unit 703.

The computing device 701 may also comprise other removable/non-removable, volatile/non-volatile computer storage media. By way of example, FIG. 7 shows a mass storage device 704 which may provide non-volatile storage of computer code, computer readable instructions, data structures, program modules, and other data for the computing device 701. For example and not meant to be limiting, a mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 704, including by way of example, an operating system 705 and service software 706. Each of the operating system 705 and service software 706 (or some combination thereof) may comprise elements of the programming and the service software 706. Service data 707 may also be stored on the mass storage device 704. Service data 707 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

A user may enter commands and information into the computing device 701 via an input device (not shown). Examples of such input devices comprise, but are not limited to, a keyboard, pointing device (e.g., a "mouse"), a microphone, a joystick, a touchscreen, tactile input devices such as gloves, and other body coverings, and the like. These and other input devices may be connected to the processing unit 703 via a human machine interface 702 that is coupled to the system bus 713, but may be connected by other interface and bus structures, such as a parallel port, game port, an IEEE 1394 Port (also known as a Firewire port), a serial port, or a universal serial bus (USB).

A display device 711 may also be connected to the system bus 713 via an interface, such as a display adapter 709. The computing device 701 may have more than one display adapter 709 and the computing device 701 may have more than one display device 711. For example, a display device may be a monitor, an LCD (Liquid Crystal Display), or a projector. In addition to the display device 711, other output peripheral devices may comprise components such as speakers (not shown) and a printer (not shown) which may be connected to the computing device 701 via input/output interface 710. Any step and/or result of the methods may be output in any form to an output device. Such output may be any form of visual representation, including, but not limited to, textual, graphical, animation, audio, tactile, and the like. The display device 711 and computing device 701 may be part of one device, or separate devices.

The computing device 701 may operate in a networked environment using logical connections to one or more remote computing devices 714*a,b*. By way of example, a remote computing device may comprise a personal computer, portable computer, smartphone, a server, a router, a network computer, a peer device, or another network node. For example, one or more of the remote computing devices 714*a,b* may comprise a computing device associated with a service provider, such as a security central monitoring station or a premises management station. Logical connections between the computing device 701 and a remote computing device 714*a,b* may be made via a network 715, such as a local area network (LAN) and a general wide area network (WAN). Such network connections may be through a network adapter 708. A network adapter 708 may be implemented in both wired and wireless environments. Such networking environments may be similar to networking environments found in dwellings, offices, enterprise-wide computer networks, intranets, and the Internet.

The computing device 701 may operate in a networked environment using logical connections to one or more local computing devices 716*a,b*. The local computing devices 716*a,b* and the computing device 701 may be located at a premises. By way of example, a local computing device 716*a,b* may comprise a personal computer, portable computer, smartphone, a server, a router, a network computer, a peer device, another network node. A local computing device 716*a,b* may comprise a premises management device. A premises management device may comprise a security system device, such as a sensor device, a camera device, or an alarm device, for example. A premises management device may comprise an automation device, such as a lighting device, a timing device, a power control device, an audio device, an entertainment device, or an Internet of Things (IoT device, for example. The computing device 701 may comprise a gateway device. A gateway device may relay communications between local computing devices 716*a,b* at the premises. For example, one or more local computing devices 716*a,b* may be configured to communicate using different communication protocols. The gateway device may be configured to communicate using more than one communication protocol. The gateway device may translate communications received from one of the local computing devices 716*a,b*, received via a first protocol to a second protocol, different from the first protocol, where the second protocol may be associated with another of the local computing devices 716*a,b*. The gateway device may be configured to enable control or access to data of one or more of the local computing devices 716*a,b*. The gateway device may send data associated with one or more of the local computing devices 716*a,b* to one or more of the remote computing devices 714*a,b*. The gateway device may cause output of an indication of data associated with one or more of the local computing devices 716*a,b*, such as via a display. The gateway device may comprise the display. The display may comprise the display device 711 in communication with the gateway device. The gateway device may be in communication with the display via the input/output interface 710.

Logical connections between the computing device 701 and a local computing device 716*a,b* may be made via a network 717, such as a local area network (LAN). Such network connections may be through the network adapter 708. The network adapter 708 may be implemented in both wired and wireless environments. Logical connections between the computing device 701 and a local computing device 716*a,b*, may be made via a wired connection, such as via the input/output interface 710.

For example, application programs and other executable program components such as the operating system 705 are shown as discrete blocks, although it is recognized that such programs and components reside at various times in different storage components of the computing device 701, and may be executed by the data processor(s) of the computer. An implementation of service software 706 may be stored on or transmitted across some form of computer readable media. Any of the disclosed methods may be performed by computer readable instructions embodied on computer readable media. Computer readable media may comprise any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:

receiving, from a first sensor device disposed on a first moveable pane of a plurality of moveable panes of a window, an indication of an angular position of the first moveable pane;

receiving, from a second sensor device disposed on a second moveable pane of the plurality of moveable panes of the window, an indication of an angular position of the second moveable pane; and based on a determination that the angular position of the first moveable pane differs from the angular position of the second moveable pane by a threshold amount, determining the window is in a breached state.

2. The method of claim 1, further comprising sending, to each of the first and second sensor devices, a request for the indication of the angular position of the moveable pane on which the sensor device is disposed.

3. The method of claim 1, wherein the method further comprises, based on determining the window is in the breached state, causing at least one of triggering of an alarm, sending of a notification, generating of a noise, initiating of a communication, or triggering of a light.

4. The method of claim 1, wherein the indication of the angular position of each of the first and second moveable panes comprises an indication of one of an angle of tilt or an angle of rotation of the moveable pane.

5. The method of claim 1, wherein the plurality of moveable panes of the window comprises a subset of all moveable panes of the window.

6. The method of claim 1, wherein each of the first and second sensor devices comprises at least one of a rolling ball sensor, a tilt sensor, an inclinometer, or an orientation sensor.

7. The method of claim 1, wherein the window comprises at least one of a jalousie window or a louver window.

8. A computing device comprising:

one or more processors; and memory storing instructions that, when executed by the one or more processors, cause the computing device to:

receive, from a first sensor device disposed on a first moveable pane of a plurality of moveable panes of a window, an indication of an angular position of the first moveable pane;

receive, from a second sensor device disposed on a second moveable pane of the plurality of moveable panes of the window, an indication of an angular position of the second moveable pane; and based on a determination that the angular position of the first moveable pane differs from the angular position of the second moveable pane by a threshold amount, determine the window is in a breached state.

9. The computing device of claim 8, wherein the instructions, when executed, further cause the computing device to send, to each of the first and second sensor devices, a request for the indication of the angular position of the moveable pane on which the sensor device is disposed.

10. The computing device of claim 8, wherein the instructions, when executed, further cause the computing device to, based on determining the window is in the breached state, cause at least one of triggering of an alarm, sending of a notification, generating of a noise, initiating of a communication, or triggering of a light.

11. The computing device of claim 8, wherein the indication of the angular position of each of the first and second moveable panes comprises an indication of one of an angle of tilt or an angle of rotation of the moveable pane.

12. The computing device of claim 8, wherein the plurality of moveable panes of the window comprises a subset of all moveable panes of the window.

13. The computing device of claim 8, wherein each of the first and second sensor devices comprises at least one of a rolling ball sensor, a tilt sensor, an inclinometer, or an orientation sensor.

14. The computing device of claim 8, wherein the window comprises at least one of a jalousie window or a louver window.

15. A non-transitory computer-readable medium storing instructions that, when executed, cause:

receiving, from a first sensor device disposed on a first moveable pane of a plurality of moveable panes of a window, an indication of an angular position of the first moveable pane;

receiving, from a second sensor device disposed on a second moveable pane of the plurality of moveable panes of the window, an indication of an angular position of the second moveable pane; and based on a determination that the angular position of the first moveable pane differs from the angular position of the second moveable pane by a threshold amount, determining the window is in a breached state.

16. The non-transitory computer-readable medium of claim 15, wherein the instructions further cause sending, to each of the first and second sensor devices, a request for the indication of the angular position of the moveable pane on which the sensor device is disposed.

17. The non-transitory computer-readable medium of claim 15, wherein the instructions further cause causing, based on determining the window is in the breached state, at least one of triggering of an alarm, sending of a notification, generating of a noise, initiating of a communication, or triggering of a light.

18. The non-transitory computer-readable medium of claim 15, wherein the plurality of moveable panes of the window comprises a subset of all moveable panes of the window.

19. The non-transitory computer-readable medium of claim 15, wherein each of the first and second sensor devices comprises at least one of a rolling ball sensor, a tilt sensor, an inclinometer, or an orientation sensor.

20. The non-transitory computer-readable medium of claim 15, wherein the window comprises at least one of a jalousie window or a louver window.

* * * * *